US012119600B2

(12) United States Patent
Nonaka et al.

(10) Patent No.: US 12,119,600 B2
(45) Date of Patent: Oct. 15, 2024

(54) RUBBER PLUG HOLDING STRUCTURE FOR TERMINAL

(71) Applicant: YAZAKI CORPORATION, Tokyo (JP)

(72) Inventors: Shinya Nonaka, Shizuoka (JP); Kazuto Ohtaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 35 days.

(21) Appl. No.: 17/744,083

(22) Filed: May 13, 2022

(65) Prior Publication Data

US 2022/0368038 A1 Nov. 17, 2022

(30) Foreign Application Priority Data

May 17, 2021 (JP) ................................ 2021-083074

(51) Int. Cl.
*H01R 4/18* (2006.01)
*H01R 13/52* (2006.01)

(52) U.S. Cl.
CPC ......... *H01R 4/185* (2013.01); *H01R 13/5205* (2013.01)

(58) Field of Classification Search
CPC .......... H01R 4/185; H01R 4/188; H01R 4/70; H01R 9/24; H01R 13/52; H01R 13/5205; H01R 13/5216; H02G 15/013; H02G 15/02; F16J 15/02; F16J 15/06
USPC .. 174/74 R, 74 A, 77 R, 78, 79, 84 R, 84 C; 439/273, 274, 275, 281, 587, 589, 877, 439/882, 885, 888, 889
See application file for complete search history.

(56) References Cited

U.S. PATENT DOCUMENTS

| | | | | | |
|---|---|---|---|---|---|
| 5,519,170 | A * | 5/1996 | Nabeshima | H01R 13/5205 | 439/888 |
| 7,211,731 | B2 * | 5/2007 | Nagamine | H01R 13/5205 | 174/77 R |
| 7,285,013 | B1 * | 10/2007 | Tabata | H01R 43/04 | 439/587 |
| 8,251,759 | B2 * | 8/2012 | Matsunaga | H01R 4/185 | 439/877 |
| 11,367,969 | B2 * | 6/2022 | Shimada | H01R 13/5216 | |

(Continued)

FOREIGN PATENT DOCUMENTS

| | | | | |
|---|---|---|---|---|
| JP | 60-71082 U | | 5/1985 | |
| JP | 5-2382 U | | 1/1993 | |
| JP | 08-37079 A | * | 2/1996 | H01R 43/048 |

(Continued)

*Primary Examiner* — William H. Mayo, III
(74) *Attorney, Agent, or Firm* — Sughrue Mion, PLLC

(57) ABSTRACT

A rubber plug holding structure for a terminal. The structure includes an electric wire that has a core wire and an insulating coating which coats the core wire; a rubber plug through which the electric wire is inserted and which seals a gap with the electric wire; and a terminal that has a first press-fastening piece which press-fastens an outer periphery of the rubber plug. The terminal also has a second press-fastening piece that is formed from a portion of the terminal which remains after cutting a connecting piece serving as a connecting portion of a carrier when the terminal is formed from a chain terminal. The second press fastening piece is press-fastened against a part of the outer periphery of the rubber plug.

2 Claims, 5 Drawing Sheets

(56) References Cited

U.S. PATENT DOCUMENTS

| | | | | |
|---|---|---|---|---|
| 2002/0171207 | A1* | 11/2002 | Torii .................. | H01R 13/5205<br>277/607 |
| 2010/0255703 | A1* | 10/2010 | Yoshioka ........... | H01R 13/5205<br>439/273 |

FOREIGN PATENT DOCUMENTS

| | | | |
|---|---|---|---|
| JP | 2002-50431 | A | 2/2002 |
| JP | 2011-170996 | A | 9/2011 |
| JP | 2012-84479 | A | 4/2012 |

* cited by examiner

RUBBER PLUG HOLDING STRUCTURE FOR TERMINAL

CROSS-REFERENCE TO RELATED APPLICATIONS

The present application is based on, and claims priority from Japanese Patent Application No. 2021-083074, filed on May 17, 2021, the entire contents of which are incorporated herein by reference.

TECHNICAL FIELD

The present disclosure relates to a rubber plug holding structure for a terminal.

BACKGROUND

JP No. 2011-170996 A discloses a rubber plug holding structure for a terminal that includes: an electric wire which has a core wire and an insulating coating; a female terminal that includes a wire barrel which is crimped to the core wire of the electric wire, and an insulation barrel which is crimped to the insulating coating and a rubber plug; and the rubber plug, which is fitted to a terminal of the insulating coating of the electric wire. Projections are formed on the insulation barrel of the female terminal to enhance the holding force against the rubber plug coming off. The projections are formed by performing cutting and raising at a plurality of positions at the inner surface side of the tip portion of a barrel piece of the insulation barrel.

SUMMARY

However, in the rubber plug holding structure for a terminal, when the female terminal to which the rubber plug is crimped is assembled to the housing, the rubber plug is easily broken due to edge portions of the projections of the barrel piece biting into the rubber plug. This may cause water to enter into the housing and may cause disconnection of a circuit. Further, the plurality of projections are provided at a plurality of positions on the barrel piece of the insulation barrel of the female terminal. Therefore, the width of the barrel piece is increased and the overall length is increased. Accordingly, the entire terminal is increased in size and the cost is increased.

An object of the present disclosure is to provide a rubber plug holding structure for a terminal capable of preventing rubber plug breakage due to crimping of a terminal and capable of reducing the cost.

A rubber plug holding structure for a terminal according to an embodiment includes: an electric wire that includes a core wire and an insulating coating that coats the core wire; a rubber plug through which the electric wire is inserted and which seals a gap with the electric wire; and a terminal that has a first press-fastening piece which press-fastens an outer periphery of the rubber plug, in which the terminal includes a second press-fastening piece, the second press-fastening piece being formed of a portion of the terminal which remains after cutting a connecting piece serving as a connecting portion of a carrier when the terminal is formed from a chain terminal, and the second press-fastening piece press-fastening a part of the outer periphery of the rubber plug.

The second press-fastening piece may be formed in a planar shape.

The second press-fastening piece may be curved in a concave arc shape in which a curvature radius is larger than a diameter of the rubber plug.

The second press-fastening piece may be curved in a convex arc shape projecting toward the rubber plug.

The second press-fastening piece may extend continuously on a rear edge side of a bottom plate of the terminal and may he folded inward toward the rubber plug from the rear edge of the bottom plate.

According to the above structure, it is possible to provide a rubber plug holding structure for a terminal capable of preventing rubber plug breakage due to crimping of a terminal and capable of reducing the cost.

DETAILED DESCRIPTION

Hereinafter, a rubber plug holding structure for a terminal according to an embodiment will be described in detail with reference to the drawings.

Figure 4:
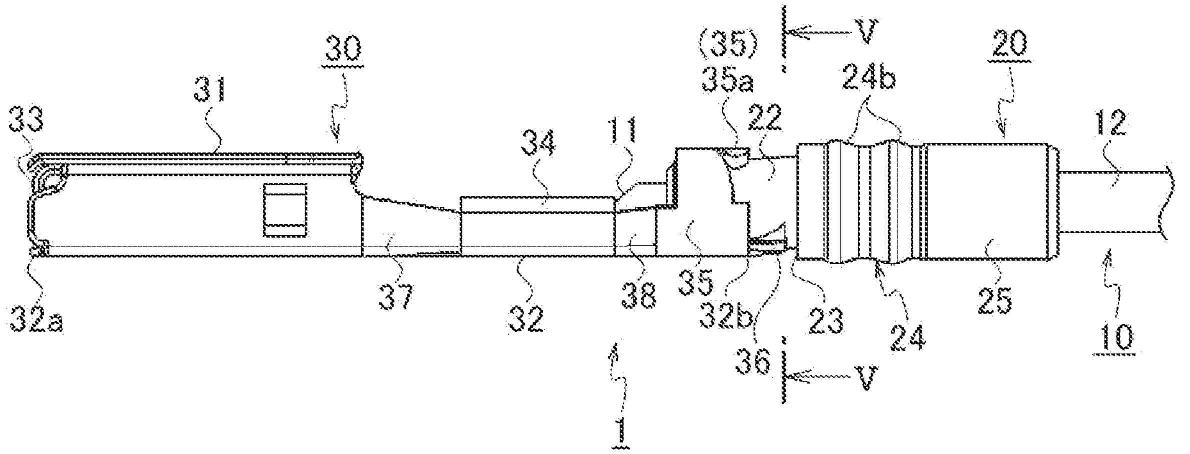
FIG. 4 is a side view of a rubber plug holding structure for a terminal.

For the convenience of the explanation, a predetermined direction which is the direction of extension of an electric wire 10 is set as the length direction. A predetermined direction which is orthogonal to the length direction is set as the height direction. The height direction is a direction in which, as shown in FIG. 4, a core wire press-fastening piece 34 is formed in a rectangular plate shape from a bottom plate 32, which is assumed to be the lower surface side. The height direction is also parallel to a V-V line in FIG. 4. A direction which is orthogonal to the length direction and the height direction is set as the width direction. The directions such as "front and back", "up and down", and the like are determined for the convenience of the explanation, and do not limit the actual mounting position or the like of each element.

Figure 1:
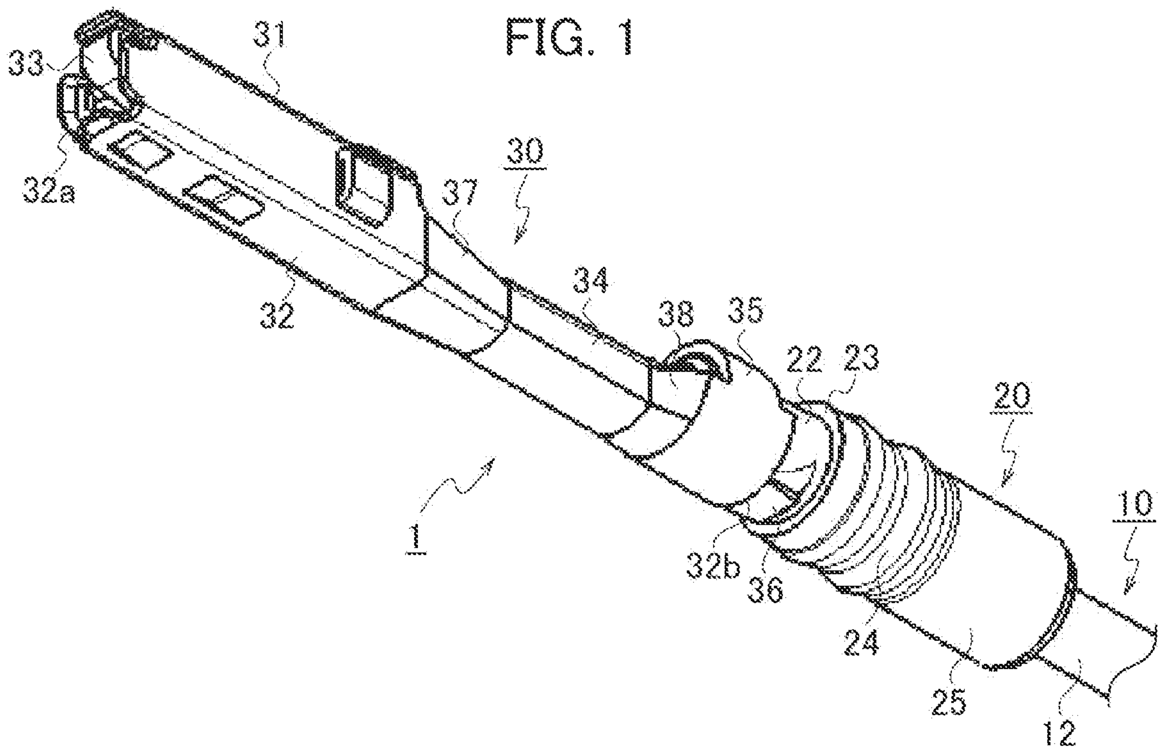
FIG. 1 is a perspective view of a rubber plug holding structure for a terminal according to an embodiment as viewed from the lower surface side.
Figure 2:
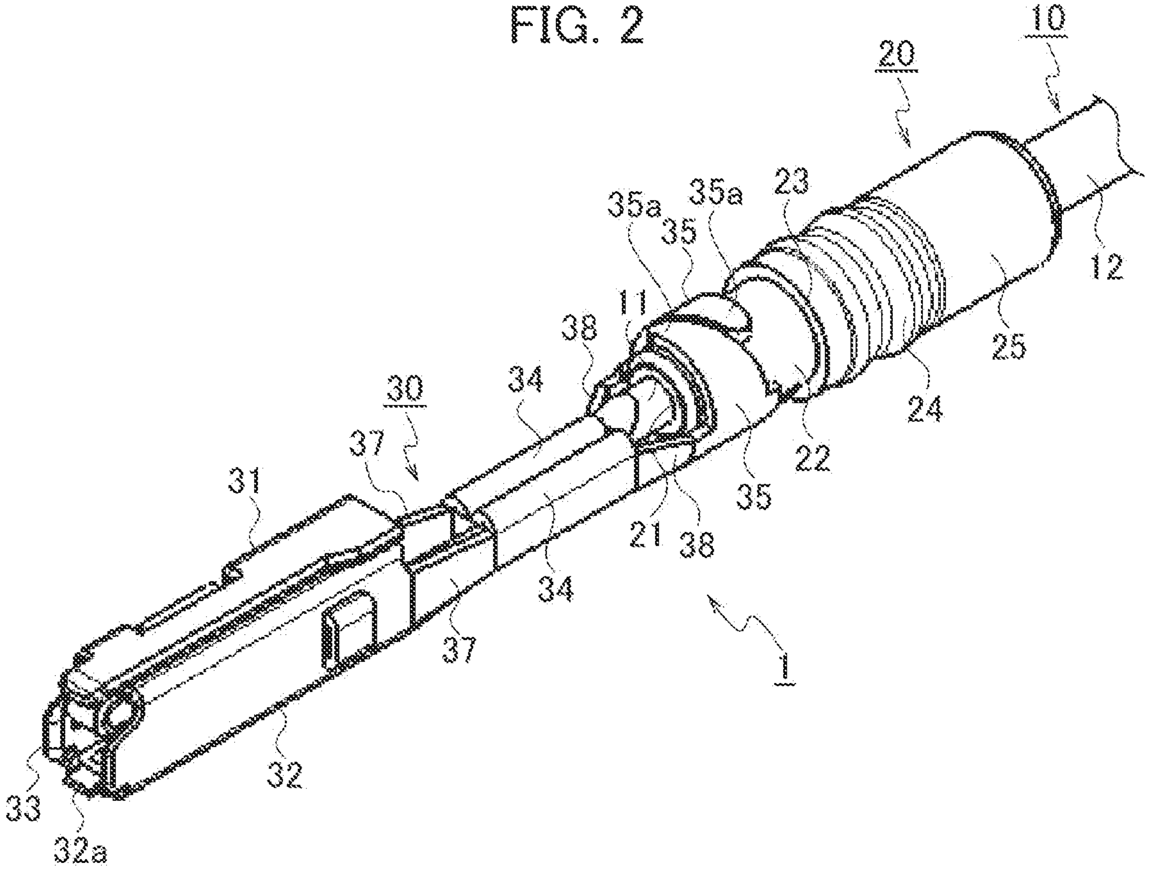
FIG. 2 is a perspective view of a rubber plug holding structure for a terminal as viewed from the upper surface side.
Figure 3:
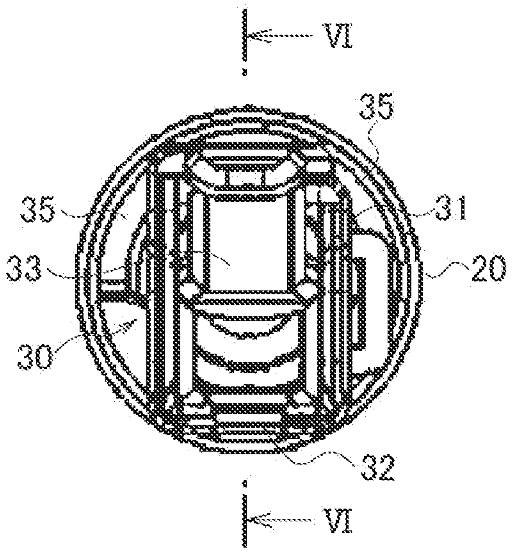
FIG. 3 is a front view of a rubber plug holding structure for a terminal.

As shown in FIGS. 1, 2, and 4, a rubber plug holding structure for a terminal 1 includes the electric wire 10, a rubber plug 20, and a terminal 30.

Figure 6A:
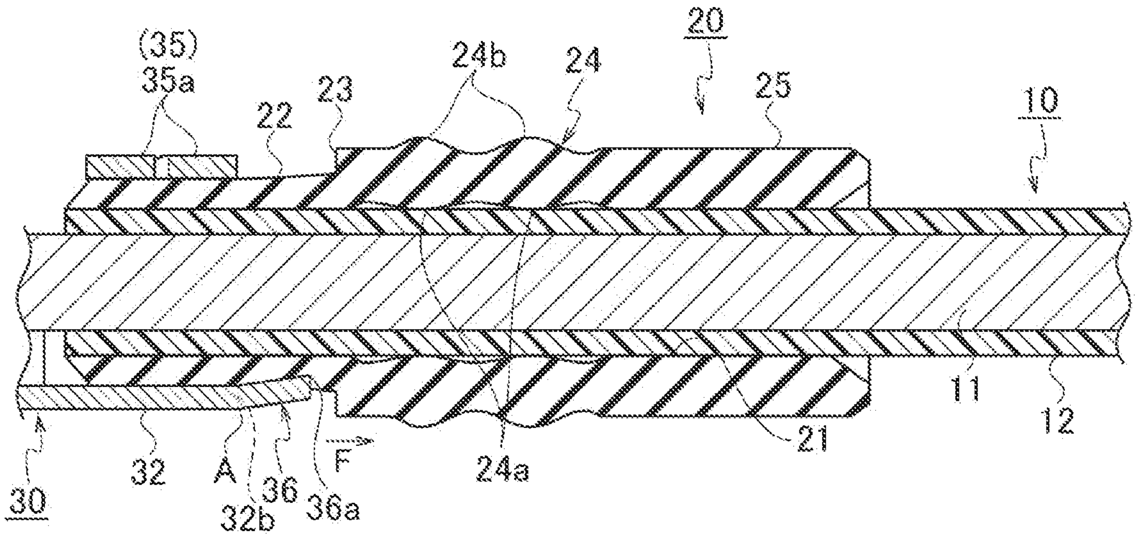
FIG. 6A is a cross sectional view taken along line VI-VI of FIG. 3 which shows a state in which a second press-fastening piece of a terminal is folded from a rear edge of a bottom plate.
Figure 6B:
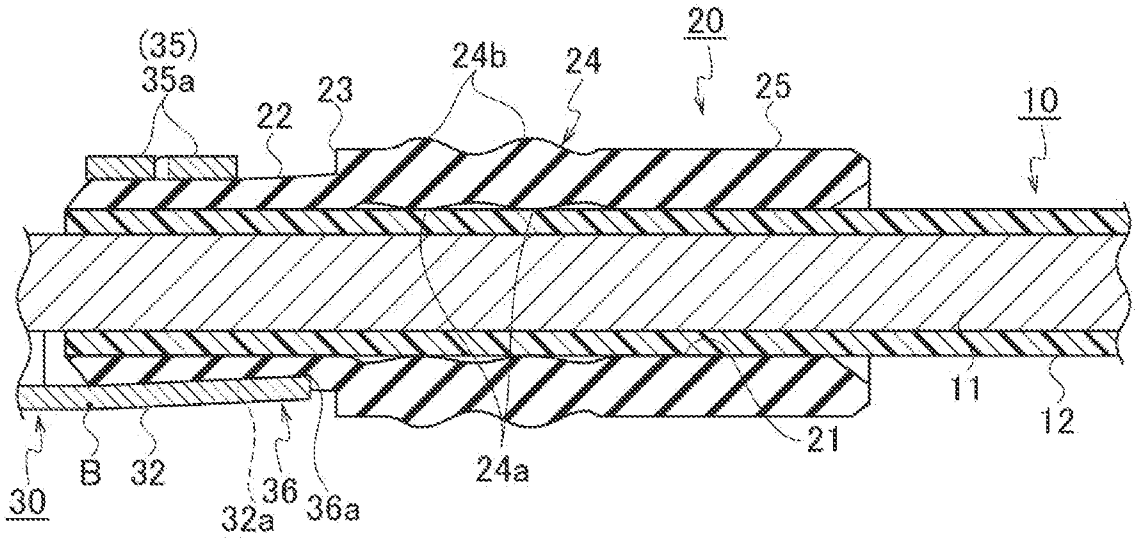
FIG. 6B is a cross sectional view taken along line VI-VI of FIG. 3 which shows a state in which a second press-fastening piece of a terminal is folded from a front side of a rear edge of a bottom plate.

As shown in FIGS. 4, 6A, and 6B, the electric wire 10 has a core wire 11 and an insulating coating 12. The core wire 11 is formed by twisting a plurality of element wires which are made of a copper alloy or the like and are conductors. The insulating coating 12 is made of a synthetic resin and coats the core wire 11.

As shown in FIGS. 2, 4, 6A, and 6B, the rubber plug 20 is formed in a substantially cylindrical shape by using an elastic rubber material. The electric wire 10 is inserted into an insertion hole 21 of the rubber plug 20 to seal a gap between the insulating coating 12 of the electric wire 10 and the insertion hole 21. The rubber plug 20 has a crimped portion 22, a seal portion 24, and an extension portion 25 in this order from the front side. The terminal 30 is crimped to the crimped portion 22. The seal portion 24 is formed in a large diameter cylindrical shape on the rear side of the crimped portion 22 with a step 23 being interposed therebetween. The extension portion 25 is formed continuously in a cylindrical shape on the rear side of the seal portion 24. As shown in FIGS. 6A and 6B, a pair of inner lips 24*a* and 24*a* which are in pressure-contact with and seal the insulating coating 12 of the electric wire 10 are formed on the inner peripheral surface of the seal portion 24. The inner lips 24*a* and 24*a* project annularly around the whole periphery. A pair of outer lips 24*b* and 24*b* which are press-fitted into and seal a terminal housing chamber (not shown) of a housing are formed on the outer peripheral surface of the seal portion 24. The outer lips 24*b* and 24*b* project annularly around the whole periphery.

Figure 7:
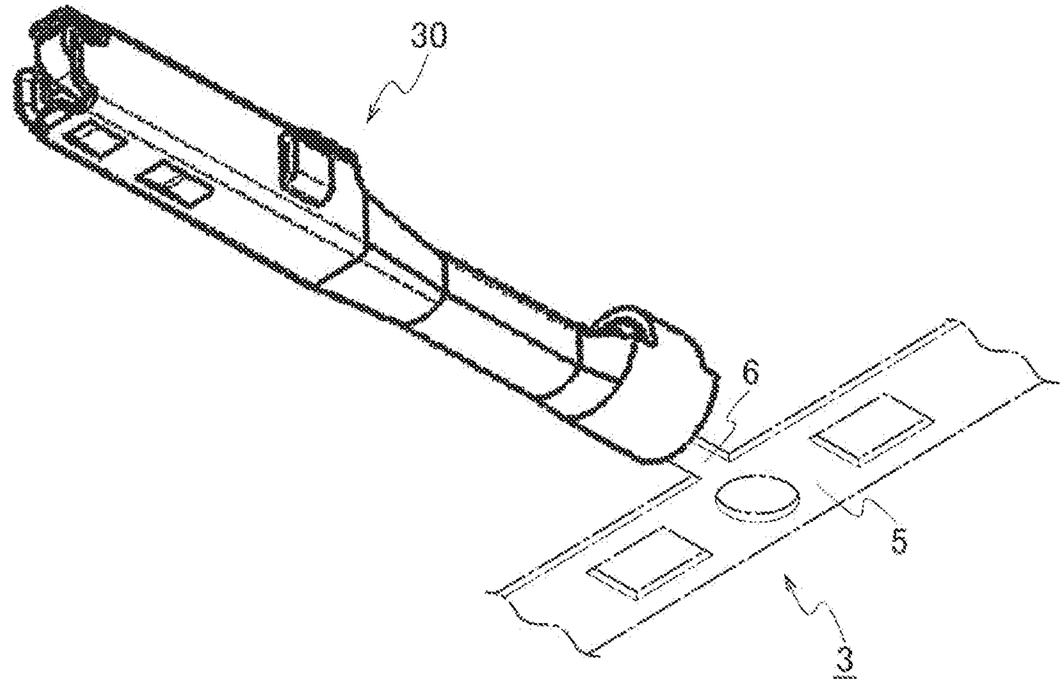
FIG. 7 is a perspective view when a terminal used in a rubber plug holding structure for a terminal is formed from a chain terminal.

The terminal 30 is made of a conductive metal plate. As shown in FIG. 7, the terminal 30 is subjected to press-forming or the like in a chained state to be formed in a predetermined shape. Specifically, as shown in FIG. 4, the terminal 30 includes a substantially box-shaped connection portion 31, a core wire press-fastening piece 34 which press-fastens the core wire 11, a first press-fastening piece 35 which is press-fastened around the rubber plug 20, and a second press-fastening piece 36 which is press-fastened on the lower side of the rubber plug 20 in the height direction. As shown in FIG. 7, the terminal 30 is press-formed on a plurality of chain terminals 3 in a chained state. On a rear edge 32*b* side of the bottom plate 32, the terminal 30 has a portion which remains after cutting and separating a strip-like carrier 5 side of a connecting piece 6 from the carrier 5 when the electric wire 10 is crimped to each chain terminal 3. The remaining portion (most of the portion) of the connecting piece 6 formed by the separation serves as the second press-fastening piece 36. That is, rear edges 32*b* of bottom plates 32 of a plurality of terminals 30 in the length direction are connected to strip-like carriers 5 of chain terminals 3 with connecting pieces 6 being interposed therebetween. The plurality of terminals 30 are press-formed in a state where they are horizontally chained in parallel. The electric wires 10 are crimped to the terminals.

As shown in FIGS. 1, 2, and 4, the substantially box-shaped connection portion 31 of the terminal 30 has an elastic contact piece 33, the elastic contact piece 33 being folded back in a U-shape from the front edge of a top surface located at the top position in the height direction of a front edge 32*a* that is at the front in the length direction of the bottom plate 32 toward the interior side of the connection portion 31 and toward the rear side in the length direction. A tab portion (not shown) of a male mating terminal is inserted into the substantially box-shaped connection portion 31 from the front in the length direction. The tab portion elastically contacts the elastic contact piece 33. Accordingly, the terminal 30 and the mating terminal are electrically connected.

As shown in FIGS. 1, 2, and 4, a pair of core wire press-fastening pieces 34 and 34 are formed by being folded in a rectangular plate shape upward in the height direction from both side edges of the bottom plate 32. The pair of core wire press-fastening pieces 34 and 34 are press-fastened to the core wire 11 such that tips of the press-fastening pieces are folded inward and overlapped. Accordingly, the press-fastening pieces are electrically connected to the electric wire 10. The substantially box-shaped connection portion 31 and the pair of core wire press-fastening pieces 34 and 34 are connected by using a pair of front connecting pieces 37 and 37.

As shown in FIGS. 1, 2, and 4, a pair of first press-fastening pieces 35 and 35 each has a tongue-like tip portion 35*a* which gradually becomes thinner toward the tip. The pair of first press-fastening pieces 35 and 35 are formed by being folded in a U-shape from the bottom plate 32 so as to face upward in the height direction. The pair of first press-fastening pieces 35 and 35 are press-fastened and crimped around the outer peripheral surface of the crimped portion 22 of the rubber plug 20 such that the tip portions 35*a* and 35*a* alternately abut at the front and rear in the length direction. The pair of core wire press-fastening pieces 34 and 34 and the pair of first press-fastening pieces 35 and 35 are connected by means of a pair of rear connecting pieces 38 and 38 such that the pair of first press-fastening pieces 35 and 35 protrude more outward in the width direction than the pair of core wire press-fastening pieces 34 and 34.

Figure 5A:
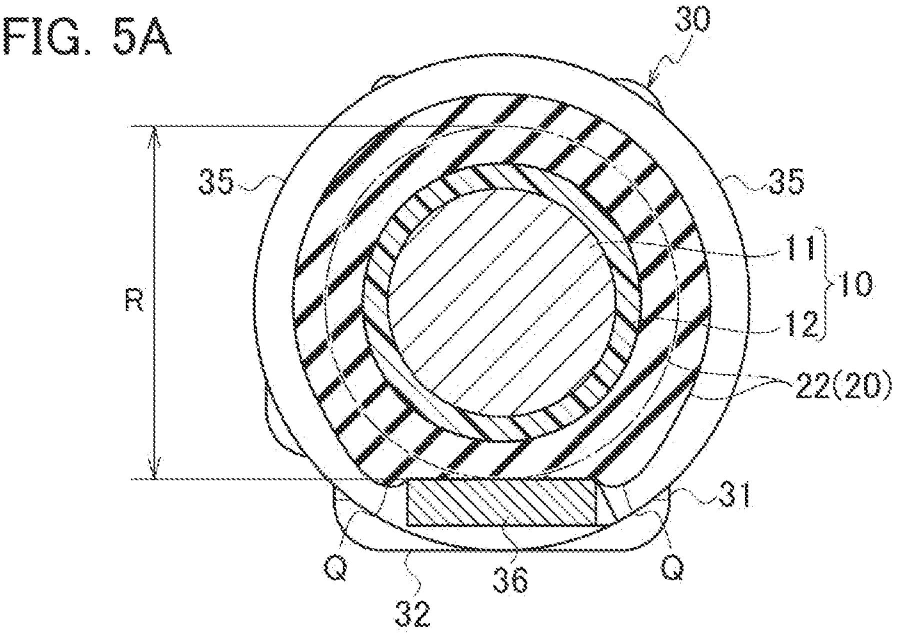
FIG. 5A is a cross sectional view taken along line V-V of FIG. 4 which shows that a second press-fastening piece of a terminal has a planar shape.
Figure 5B:
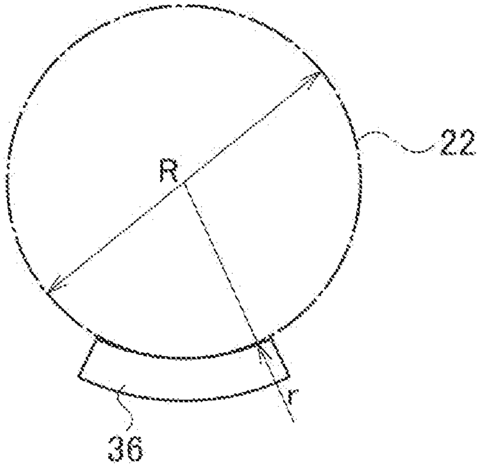
FIG. 5B is a schematic cross sectional view taken along line V-V of FIG. 4 which shows that a second press-fastening piece of a terminal has a concave curved shape.
Figure 5C:
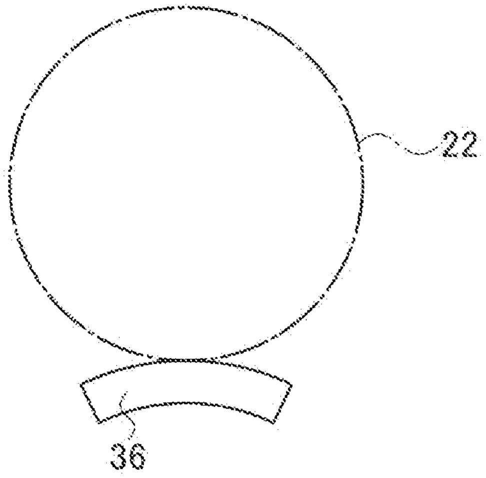
FIG. 5C is a schematic cross sectional view taken along line V-V of FIG. 4 which shows that a second press-fastening piece of a terminal has a convex curved shape.

As shown in FIGS. 1, 4, and 7, the second press-fastening piece 36 is formed of a portion of the terminal 30 which remains after cutting the connecting piece 6 serving as a connecting portion of the carrier 5 of the chain terminal 3 when the terminal 30 is formed from the chain terminal 3. The second press-fastening piece 36 is press-fastened so as to bite into a portion of the outer peripheral surface of the crimped portion 22 of the rubber plug 20 on the lower side in the height direction. As shown in FIG. 5A, the second press-fastening piece 36 has a planar cross section at a portion at which the second press-fastening piece 36 press-fastens the outer peripheral surface of the crimped portion 22 of the rubber plug 20. Further, as shown in FIG. 5B, the second press-fastening piece 36 may have, at the press-fastened portion, a cross section which is curved in a concave arc shape in which the curvature radius r is larger than the diameter R of the rubber plug 20. Further, as shown in FIG. 5C, the second press-fastening piece 36 may have, at the press-fastened portion, a cross section which is curved in a convex arc shape that projects toward the rubber plug 20. Reference character Q in FIG. 5A denotes a portion of the crimped portion 22 of the rubber plug 20 extruded by the pressurization produced by the second press-fastening piece 36. Reference character R in FIGS. 5A and 5B denotes the diameter of the crimped portion 22 of the rubber plug 20 when pressurized by the first press-fastening piece 35. The relationship between the diameter R and the curvature radius r of the second press-fastening piece 36 which is curved in a concave arc shape is $R<r$.

Further, as shown in FIG. 6A, the second press-fastening piece 36 extends continuously on the rear edge 32*b* side of the bottom plate 32 of the terminal 30. The rear edge 32*b* of the bottom plate 32 is folded inward (upward in the height direction) from a position on the lower side in the height direction of the outer peripheral surface of the crimped portion 22 of the rubber plug 20. In this case, the starting point of the folding is a position corresponding to the rear edge 32*b* of the bottom plate 32, and is denoted by reference character A in FIG. 6A. Further, as shown in FIG. 6B, the second press-fastening piece 36 may be folded inward (upward in the height direction) from a position on the lower side in the height direction of the outer peripheral surface of the crimped portion 22 of the rubber plug 2, at the front side in the length direction of the rear edge 32*b* of the bottom plate 32. In this case, the starting point of the folding is a position which is opposite the front edge of the first press-fastening piece 35 on the front side, and is denoted by reference character B in FIG. 6B. The starting point of the folding may be near the rear end of the rear edge 32*b* of the bottom plate 32 in the length direction.

According to the rubber plug holding structure for a terminal 1 of the above embodiment, when the rubber plug 20 through which the electric wire 10 is passed is crimped to the terminal 30, the core wire 11 of the electric wire 10 is press-fastened by using the pair of core wire press-fastening pieces 34 and 34. The pair of first press-fastening pieces 35 and 35 are press-fastened around the crimped portion 22 of the rubber plug 20. At the time of the press-fastening, the second press-fastening piece 36 of the terminal 30 is folded such that the tip 36*a* of the second press-fastening piece 36 bites into the lower side in the height direction of the crimped portion 22 of the rubber plug 20. The tip 36*a* of the second press-fastening piece 36 is folded inward (upward in the height direction) from the lower side in the height direction of the crimped portion 22 of the rubber plug 20. This can enhance the holding force against the rubber plug 20 coming away from the terminal 30 to which the rubber plug 20 is crimped. Further, as shown in FIG. 6A, the biting of the tip 36*a* of the second press-fastening piece 36 is oriented such that it is difficult to bite against a resistance force F produced at the time of assembling the terminal 30 into a terminal housing chamber of the housing. This can prevent breakage of the rubber plug at the time of crimping the rubber plug 20 and at the time of assembling the terminal 30. Further, suppose that the second press-fastening piece 36 having a concave arc shape in which the curvature radius r is larger than the diameter R of the rubber plug 20 is used. In the above case, the deformation of a portion of the crimped portion 22 of the rubber plug 20 which is extruded due to the pressurization of the second press-fastening piece 36 shown in FIG. 5A can be made smaller. Further, breakage of the crimped portion 22 of the rubber plug 20 can he more reliably prevented. Further, a structure is possible using the second press-fastening piece 36 curved in a convex arc shape projecting toward the rubber plug 20 side. Such a structure suitably prevents the rubber plug from being broken when the rubber plug 20 is crimped and when the terminal 30 is assembled while maintaining the holding force against the rubber plug 20 coming away from the terminal 30 to which the rubber plug 20 is crimped.

In addition, as shown in FIG. 6A, components other than the second press-fastening piece 36 have no structure for pressurizing the rubber plug 20 on the same circumference. Also, the pair of first press-fastening pieces 35 and 35 are compactly press-fastened such that the tip portions 35*a* and 35*a* of the pair of first press-fastening pieces 35 and 35 alternately abut the crimped portion 22. This can shorten the overall length of the terminal 30. Accordingly, the rubber plug holding structure for a terminal 1 can be reduced in size and cost.

Although the present embodiment has been described above, the present embodiment is not limited thereto, and various modifications can be made within the scope of the gist of the present embodiment.

That is, according to the embodiment, a description has been given regarding the case of a female terminal. However the same applies to a male terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber plug holding structure for a terminal comprising:

an electric wire that includes a core wire and an insulating coating that coats the core wire;

a rubber plug through which the electric wire is inserted and which seals a gap with the electric wire; and a terminal that has a first press-fastening piece which press-fastens an outer periphery of the rubber plug, wherein the terminal includes a second press-fastening piece, the second press-fastening piece being formed of a portion of the terminal which remains after cutting a connecting piece serving as a connecting portion of a carrier when the terminal is formed from a chain terminal, the second press-fastening piece press-fastening a part of the outer periphery of the rubber plug, and the second press-fastening piece is formed in a convex shape when viewed in cross-section.

2. The rubber plug holding structure for a terminal according to claim 1, wherein the second press-fastening piece extends continuously on a rear edge side of a bottom plate of the terminal and is folded inward toward the rubber plug from the rear edge of the bottom plate.

* * * * *